United States Patent [19]

Feucht

[11] 3,921,088

[45] Nov. 18, 1975

[54] DIRECT-CURRENT ISOLATION AMPLIFIER

[75] Inventor: Peter Feucht, Berlin, Germany

[73] Assignee: Siemens Aktiengesellschaft, Munich, Germany

[22] Filed: Dec. 10, 1973

[21] Appl. No.: 423,118

[30] Foreign Application Priority Data

Dec. 11, 1972 Germany ............................ 2260440

[52] U.S. Cl. .................................. 330/10; 330/103

[51] Int. Cl.[2] .......................................... H03F 3/38

[58] Field of Search ................................ 330/10, 59

[56] References Cited

UNITED STATES PATENTS

| | | | |
|---|---|---|---|
| 3,156,859 | 5/1973 | Nelson | 330/10 X |
| 3,401,357 | 9/1968 | D'Asaro | 330/59 X |
| 3,585,517 | 10/1972 | Morrison | 330/10 X |
| 3,699,423 | 6/1971 | Herbert | 330/10 |
| 3,735,274 | 11/1964 | Cox | 321/8 |

*Primary Examiner*—Nathan Kaufman
*Attorney, Agent, or Firm*—Kenyon & Kenyon Reilly Carr & Chapin

[57] ABSTRACT

A direct-current amplifier contains a modulator which supplies a frequency-modulated and pulse-width modulated alternating-current signal. A transmission path operatively connects the modulator to a demodulator and may falsify the pulse edges of the output pulses of the modulator. The demodulator is a demodulator for frequency modulated signals in the case that the transmission path falsifies the pulse edges, and a demodulator for pulse width-modulated signals in the case that the pulse edges are transmitted correctly and without timing error. The direct-current amplifier is applicable for situations wherein the inputs and outputs of the amplifier are metallically separated from each other.

7 Claims, 5 Drawing Figures

DIRECT-CURRENT ISOLATION AMPLIFIER

BACKGROUND OF THE INVENTION

The invention relates to direct-current isolation amplifier with a modulator for the input signal, an alternating-current transmission path following the modulator and a demodulator connected to the transmission path. Direct-current isolation amplifiers are used for measuring small and medium voltages which are at a high-voltage potential with respect to ground. The input for the voltages to be measured must therefore be metallically separated from the amplifier output.

In general, the input signal is modulated and an isolation transformer is connected between the input and the output for separating the potentials. It is common to subject the input signal to amplitude modulation. Amplifiers with such modulation are also known as chopper amplifiers. Such an amplifier is described, for instance, in the Deutsche Auslegeschrift No. 1,811,987. These chopper amplifiers have the disadvantage that the amplitudes of the alternating-voltage signals, which vary over a wide range, must be transmitted with exact linearity, because otherwise, the output signal of the amplifier is not proportional to the input signal.

SUMMARY OF THE INVENTION

It is an object of the invention to provide a direct-current isolation amplifier having output and input voltages between which there is a desired relation of high accuracy, such a relation being proportionality for example. It is another object of the invention to provide such an amplifier that can be made at low cost notwithstanding the great accuracy obtained therewith.

According to the invention, these objects are realized in the direct-current isolation amplifier of the invention by providing therein a modulator which delivers a frequency-modulated and pulse-width modulated alternating-voltage signal. A transmission path operatively connects the modulator to a demodulator and may falsify the pulse edges. The demodulator is a demodulator for frequency-modulated signals in the case that the transmission path falsifies the pulse edges, and is a demodulator for pulse-width modulated signals in the case that the pulse edges are transmitted correctly and without timing error.

If a demodulator for frequency-modulated signals is used, then the modulated signal can suffer arbitrary distortion of the wave-shape and, except for envelope delay distortion, any delay. The modulated signal can therefore be transmitted via lines or light conductors with a light-emitting diode at the input and a photodiode at the output in any manner desired. For this purpose, however, a demodulation time constant with the required accuracy, and if necessary high accuracy, must be reconstructed in the demodulator; this involves considerable cost at carrier frequencies above 50 to 100 kHz. If, however, a demodulator for pulse-width modulated signals is used, no generator for generating the demodulation time constant is needed. To this end, the pulse edges must, however, be transmitted from the modulator to the demodulator accurately and without timing error. An isolation transformer generally meets these requirements, so that in a simple isolation amplifier without a long transmission path and wherein the pulses are therefore transmitted only within the amplifier housing, such an isolation amplifier can be used and in a simple demodulator for pulse-width modulated signals is sufficient.

A voltage-frequency converter operating according to the charge compensation principle can be used as the modulator which furnishes a frequency-modulated and pulse-width modulated alternating-voltage signal. Such a modulator operates in the manner that the input signal is fed to an integrator. If the output voltage of the integrator reaches a given value, a pulse with a certain charge content and polarity opposite to that of the input signal is fed to the input of the integrator. If the charge of the pulse is made dependent on the pulse frequency generated or on the spacing in time of the pulses, that is, the period, a desired nonlinearity can be obtained, more specifically, the output voltage can, for example, be made proportional to the square, the logarithm or the root of the input voltage.

As the modulator, a voltage-frequency converter can further be used which operates according to the discharge principle. Such voltage-frequency converters also contain an integrator which, however, is discharged not by pulses of constant charge, but by short-circuiting its input.

Although the invention is illustrated and described herein as a direct-current isolation amplifier, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
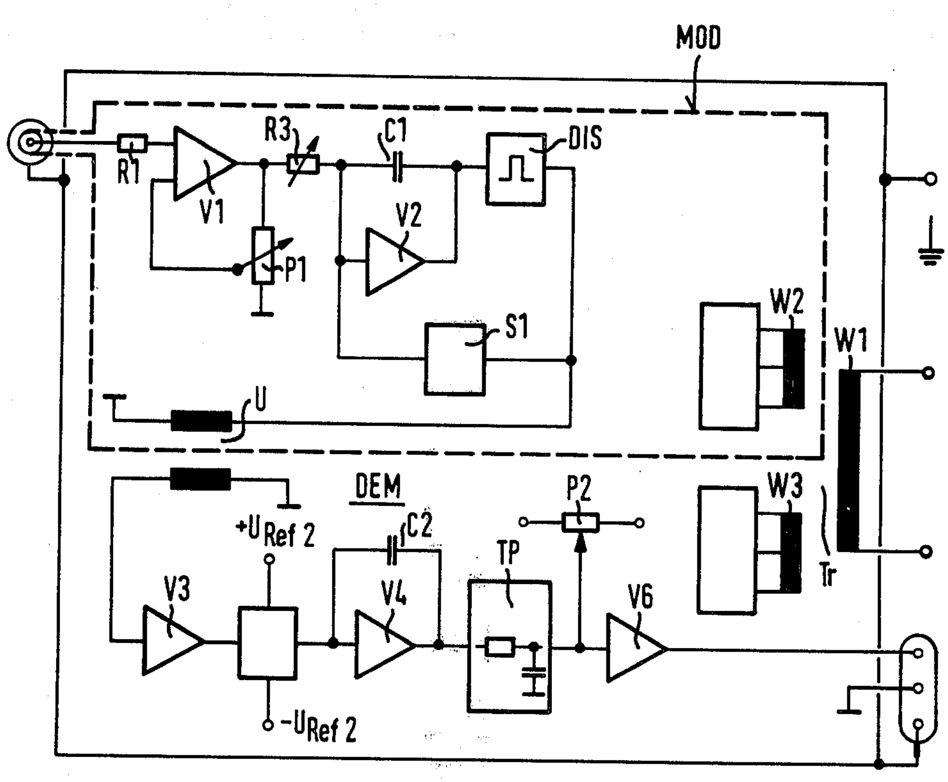
FIG. 1 is a schematic diagram of the direct-current isolation amplifier according to the invention showing the modulator and demodulator thereof coupled by transmission means in the form of a transformer.

In the arrangement according to FIG. 1, the input signal is fed to a modulator MOD via a double-shielded coaxial input jack. The modulator is mounted with respect to an inner shield; whereas, the outer shield encloses the entire isolation amplifier. The input signal reaches the non-inverting input of an input amplifier V1 via an input resistor R1. The output of the amplifier V1 is negatively fed back to the inverting input via a voltage divider P1 having a grounded base. This negative feedback branch of the amplifier is switchable, so that the isolation amplifier can cover a large range of input voltages.

An integrator is connected to the input amplifier V1 through an adjustable attenuation resistor R3. The integrator is made up of an amplifier V2 and an integrating capacitor C1. The output voltage of the amplifier V1 is integrated until the output voltage of the amplifier V2 reaches a value at which a discriminator DIS following the amplifier V2 responds. The discriminator then transmits an output pulse of constant duration which is brought to constant amplitude in a circuit section S1 so that the pulse has a definite charge. The pulses of constant charge are fed to the input of the integrator and discharge the same. Then, the integration process starts over again. With increasing input voltage, the frequency of the output pulses of the discriminator DIS increases. Because the output pulses are furthermore of constant duration, the duty cycle also changes, that is, the pulse-pause relationship changes. The input signal is therefore simultaneously frequency-modulated and pulse-width modulated.

The discriminator DIS feeds further the primary winding of the pulse transformer U, to whose secondary winding the demodulator DEM is connected via an amplifier V3. The transformer U constitutes transmission means. In the demodulator the pulses of constant duration are first brought to the same amplitude and are subsequently integrated in an amplifier V4 which has negative feedback via a capacitor C2. The output signal of this integrator goes through a lowpass filter TP and then reaches an output amplifier V6. At the input of the output amplifier V6, a constant potential, which is adjustable by means of the potentiometer P2, is superimposed on the signal for adjusting the null position.

The modulator and the demodulator must get their supply voltages from separate power supplies because they are at different direct-current potentials. The transformer Tr is provided for this purpose, which, in addition to a primary winding W1, has two separate secondary windings W2 and W3, each of which is connected to a corresponding power supply.

Figure 2:
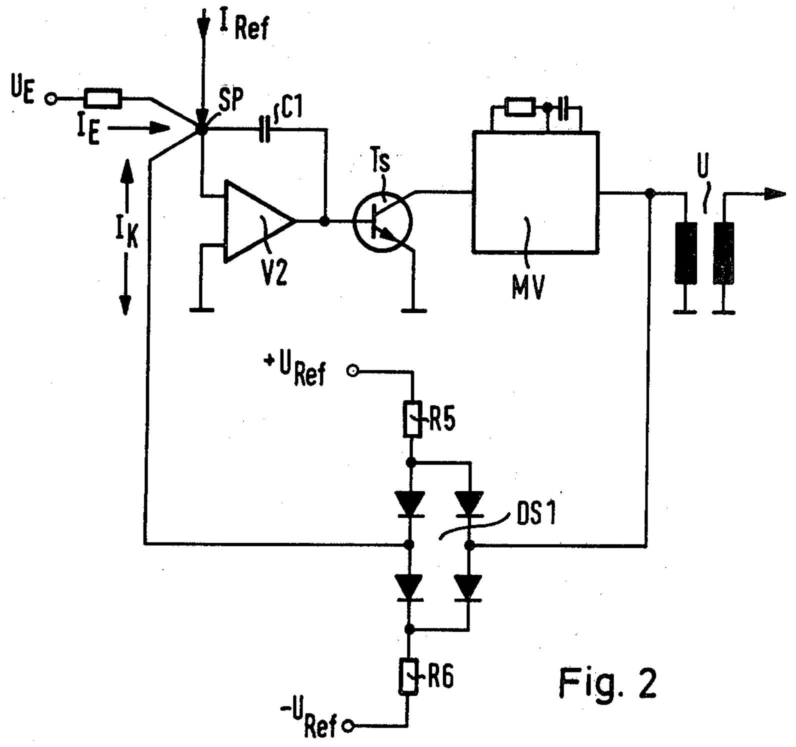
FIG. 2 is a schematic diagram showing circuit details of the moduulator.

FIG. 2 shows details of the modulator. The input current $I_E$ is balanced by the mean value of the negative-feedback current $I_K$ at a summing point SP of the integrator with the amplifier V2 and the integrating capacitor C1. If the output of the amplifier falls below the trigger threshold of a transistor Ts, a monostable multivibrator MV following the transistor Ts transmits a negative pulse of a given duration. By means of the resistor R6 and a negative reference voltage $-U_{Ref}$, the negative current $I_K$ is associated with this pulse. The pulse frequency which is fed to the transformer U is proportional to the input current $I_E$ or the input voltage $U_E$. During the pulse intervals a positive current $I_K$, whose magnitude is determined by the magnitude of the voltage $+U_{Ref}$ and the resistance R5, flows from the positive reference voltage source $+U_{Ref}$. For pre-setting a center frequency, a reference current $I_{Ref}$ is additionally fed to the summing point SP.

Figure 3:
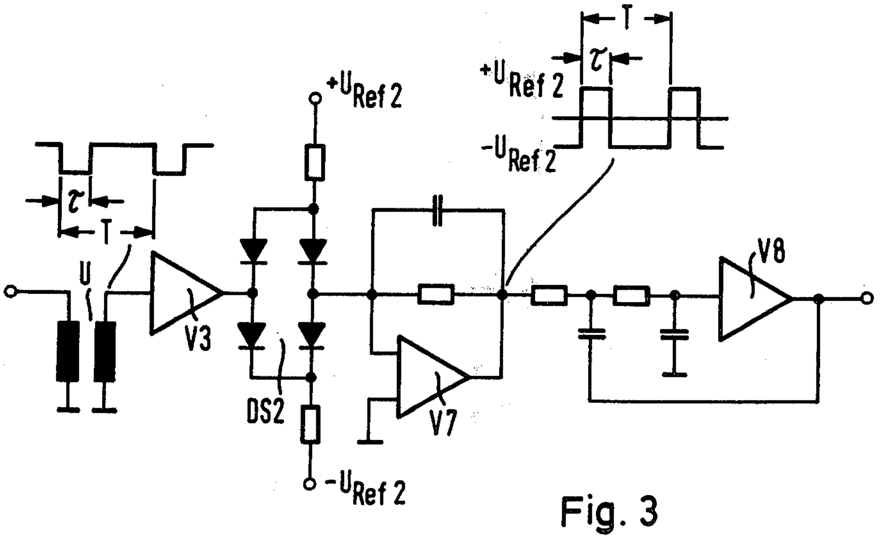
FIG. 3 is a schematic diagram showing circuit details of the demodulator.

In the arrangement according to FIG. 3 the pulses transmitted by the transformer U are demodulated. They arrive via an amplifier V3 at a diode switch DS2, which is constructed like the diode switch DS1 used in the modulator. In this way, the pulses are brought to the same amplitude. The diode switch DS2 is followed by an inverter amplifier V7 having output pulses that have the constant pulse width $\tau$ with a period T in the same manner as the negative-feedback pulses of the modulator. The amplitude of these pulses is $+U_{Ref2}$, while in the pulse intervals, the voltage $-U_{Ref2}$ appears at the output of the amplifier V7. These pulses are integrated in an active filter with the amplifier V8 and integration resistors and capacitors not specifically labelled so that at the output of the amplifier V8 a direct-current voltage signal is obtained which is proportional to the mean value of the output voltage of the amplifier

V7. For this direct-current voltage signal, called $u$, the following relation applies:

$$u = U_{Ref} \cdot \frac{2\tau - 1}{T} = U_{Ref}\,(2\tau \cdot f - 1).$$

The output voltage is therefore proportional to the mean value and is, at the same time, proportional to the pulse repetition frequency $f$, if the time constant $\tau$ is constant. This means that in the first case the modulation signal is demodulated as a pulse-width modulated signal and, in the second case, as a frequency-modulated signal.

Figure 4:
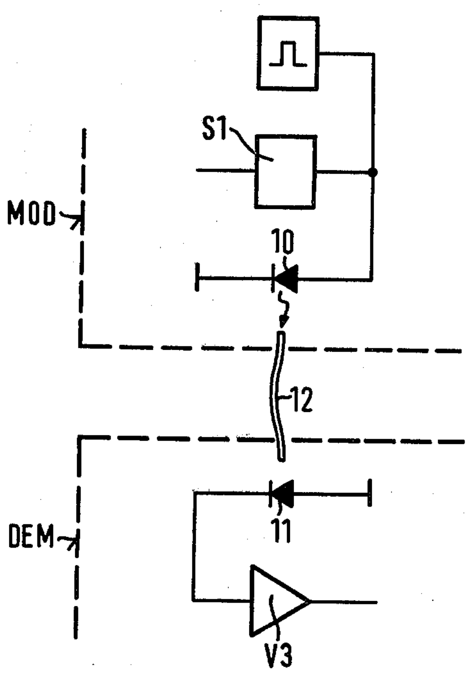
FIG. 4 illustrates an alternate embodiment of the transmission means.

FIG. 4 illustrates an alternate embodiment of the transmission means wherein the modulated signal from the modulator is transmitted to the demodulator utilizing a light-emitting diode 10 and a photo-diode 11. The light-emitting diode 10 is fed by the modulator MOD and the photo-diode 11 is connected to the demodulator DEM as shown. A light conductor 12 can also be utilized.

Figure 5:
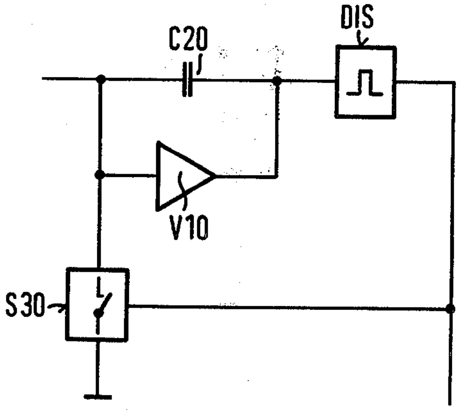
FIG. 5 illustrates an alternate embodiment of the modulator.

FIG. 5 illustrates an alternate embodiment of the modulator in the form of a voltage-frequency converter that operates according to the discharge principle. This converter has an integrator made up of an amplifier V10 and an integrating feedback capacitor C20 connected thereacross. This integrator is not discharged by an impulse of constant charge, but is instead discharged by short-circuiting the input thereof. In the illustrated embodiment, this action is effected by circuit section S30.

What is claimed is:

1. A direct-current isolation amplifier comprising:

a modulator for receiving an input signal and for generating a frequency-modulated and pulse width modulated alternating voltage pulse signal, the pulses of which have a constant width and are generated at a frequency which is proportional to the magnitude of said input signal to said modulator;

transmission means coupled to said modulator for transmitting said pulse signal; and, a demodulator coupled to said transmission means for demodulating said pulse signal as a frequency-modulated signal when said pulses of said pulse signal are not transmitted by said transmission means to said demodulator with said constant width, and for demodulating said pulse signal as a pulse-width modulated signal when said pulses are transmitted by said transmission means to said demodulator accurately with said constant width.

2. The isolation amplifier of claim 1, said modulator being a voltage-frequency converter operable according to the charge compensation method.

3. The isolation amplifier of claim 1, said modulator comprising: an integrator for receiving an input to be integrated; a discriminator for supplying a pulse of constant width in response to a given output of said integrator; and circuit means connected between the output of said discriminator and the input to said integrator for bringing said output pulse to a constant amplitude so that the same has a definite charge and for feeding said pulse of definite charge to the input of said integrator for discharging said integrator.

4. The isolation amplifier of claim 3, said integrator including an amplifier, and an integrating capacitor connected across said amplifier.

5. The isolation amplifier of claim 1, said modulator being a voltage-frequency converter operable according to the discharge method.

6. The isolation amplifier of claim 1, said transmission means being a transformer having a primary winding connected to the output of said modulator and having a secondary winding connected to said demodulator, said demodulator comprising means for bringing the output pulses of said transformer to a constant amplitude; and, lowpass filter means connected to said last-mentioned means for transforming the signal of constant amplitude into a direct-current voltage signal.

7. The isolation amplifier of claim 1, said transmission means comprising a light-emitting diode operatively connected to said modulator, and a photo-diode arranged to receive light from said light-emitting diode, said photo-diode being operatively connected to said demodulator, said demodulator comprising means for bringing the output pulses of said photo-diode to a constant amplitude; and, lowpass filter means for transforming the signal of constant amplitude into a direct-current voltage signal.

* * * * *